US012795243B2

(12) United States Patent
Yang et al.

(10) Patent No.: US 12,795,243 B2
(45) Date of Patent: Nov. 10, 2026

(54) METHOD, APPARATUS, ELECTRONIC DEVICE, AND STORAGE MEDIUM FOR DETERMINING EXPOSURE PARAMETER

(71) Applicant: Beijing Zitiao Network Technology Co., Ltd., Beijing (CN)

(72) Inventors: Dongyue Yang, Beijing (CN); Guidong Wang, Beijing (CN); Tao Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 71 days.

(21) Appl. No.: 18/782,998

(22) Filed: Jul. 24, 2024

(65) Prior Publication Data

US 2025/0039553 A1 Jan. 30, 2025

(30) Foreign Application Priority Data

Jul. 24, 2023 (CN) ......................... 202310913236.3

(51) Int. Cl.
*H04N 23/73* (2023.01)
*G06F 3/01* (2006.01)
*H04N 23/611* (2023.01)

(52) U.S. Cl.
CPC ............. *H04N 23/73* (2023.01); *G06F 3/017* (2013.01); *H04N 23/611* (2023.01)

(58) Field of Classification Search
CPC ...... H04N 23/73; H04N 23/611; H04N 23/71; H04N 23/70; G06F 3/017
See application file for complete search history.

(56) References Cited

U.S. PATENT DOCUMENTS

2016/0212355 A1* 7/2016 Pouli ......................... G06T 5/50
2019/0109973 A1* 4/2019 Riza ....................... H04N 23/55
(Continued)

FOREIGN PATENT DOCUMENTS

CN 106686319 A * 5/2017 ............. H04N 23/73
CN 115294260 A 11/2022

OTHER PUBLICATIONS

Control method and device of image exposure (Year: 2017).*
https://www.youtube.com/watch?v=kPlqO929plc&t=2s Scene Radiance and Image Irradiance | Radiometry and Reflectance (Year: 2021).*

*Primary Examiner* — Twyler L Haskins
*Assistant Examiner* — Surafel Yilmakassaye
(74) *Attorney, Agent, or Firm* — Alleman Hall LLP

(57) ABSTRACT

The disclosure provides a method, an apparatus, an electronic device, and a storage medium for determining an exposure parameter. The method includes: acquiring a gesture detection image, and determining an image scene irradiance and a gesture detection result according to the gesture detection image, the gesture detection result including a gesture detection point and/or a gesture detection box; determining image brightness control information according to the image scene irradiance and the gesture detection result; and determining an image exposure parameter according to the image brightness control information. The method in the present disclosure can avoid the problem that gesture exposure oscillates due to instability of the gesture detection algorithm and the gesture region image having different brightness, and can provide an image having a stable brightness and high quality for the gesture detection algorithm.

20 Claims, 3 Drawing Sheets

(56) References Cited

U.S. PATENT DOCUMENTS

| | | | | |
|---|---|---|---|---|
| 2022/0076006 | A1 * | 3/2022 | Gao | G06V 10/60 |
| 2023/0319393 | A1 * | 10/2023 | Cao | H04N 23/72<br>348/229.1 |

* cited by examiner

METHOD, APPARATUS, ELECTRONIC DEVICE, AND STORAGE MEDIUM FOR DETERMINING EXPOSURE PARAMETER

CROSS-REFERENCE

This disclosure claims priority to Chinese Patent Application No. 202310913236.3, filed on Jul. 24, 2023 and entitled "METHOD, APPARATUS, ELECTRONIC DEVICE, AND STORAGE MEDIUM FOR DETERMINING EXPOSURE PARAMETER", which is incorporated herein by reference in its entirety.

FIELD

The present disclosure relates to the field of computer technologies, and in particular, to a method, an apparatus, an electronic device, and a storage medium for determining an exposure parameter.

BACKGROUND

Gesture detection requires setting of appropriate camera exposures according to different gesture positions. In an exposure algorithm in the related art, an average brightness of a scene is used as a control index to adjust an exposure parameter. However, the detection accuracy of the above exposure algorithm is low in some specific environments where, for example, the hands have highlight or shadow or similar background color.

SUMMARY

This section is provided in order to present in brief form the ideas, which will be described in detail later in the detailed description section. This section is not intended to identify key features or essential features of the technical solution for which protection is claimed, nor is it intended to be used to limit the scope of the technical solution for which protection is claimed.

The present disclosure provides a method, an apparatus, an electronic device, and a storage medium for determining an exposure parameter.

The present disclosure adopts the following technical solutions.

In some embodiments, the present disclosure provides a method for determining an exposure parameter. The method includes the following steps.

- acquiring a gesture detection image, and determining an image scene irradiance and a gesture detection result according to the gesture detection image, the gesture detection result including a gesture detection point and/or a gesture detection box;
- determining image brightness control information according to the image scene irradiance and the gesture detection result; and
- determining an image exposure parameter according to the image brightness control information.

In some embodiments, the present disclosure provides an apparatus for determining an exposure parameter. The apparatus includes:

- an acquisition module configured to acquire a gesture detection image, and determine an image scene irradiance and a gesture detection result according to the gesture detection image, the gesture detection result including a gesture detection point and/or a gesture detection box;
- a first processing module configured to determine image brightness control information according to the image scene irradiance and the gesture detection result; and
- a second processing module configured to determine an image exposure parameter according to the image brightness control information.

In some embodiments, the present disclosure provides an electronic device. The electronic device includes at least one memory and at least one processor.

The memory is configured to store program codes, and the processor is configured to call the program codes stored in the memory to perform the above method.

In some embodiments, the present disclosure provides a computer-readable storage medium. The computer-readable storage medium is configured to store program codes which, when executed by a processor, cause the processor to perform the above method.

In the method for determining an exposure parameter according to the embodiment of the present disclosure, a gesture detection image is acquired, and an image scene irradiance and a gesture detection result are determined according to the gesture detection image, the gesture detection result including a gesture detection point and/or a gesture detection box; image brightness control information is determined according to the image scene irradiance and the gesture detection result; and an image exposure parameter is determined according to the image brightness control information. The embodiment of the present disclosure can avoid the problem that gesture exposure oscillates due to instability of the gesture detection algorithm and the gesture region image having different brightness, and can provide an image having a stable brightness and high quality for the gesture detection algorithm.

BRIEF DESCRIPTION OF THE DRAWINGS

The foregoing and other features, advantages, and aspects of embodiments of the present disclosure will become more apparent in conjunction with the accompanying drawings and with reference to the following specific embodiments. Throughout the accompanying drawings, the same or similar numerals indicate the same or similar elements. It should be understood that the accompanying drawings are schematic and that the parts and elements are not necessarily drawn to scale.

DETAILED DESCRIPTION

Figure 1:
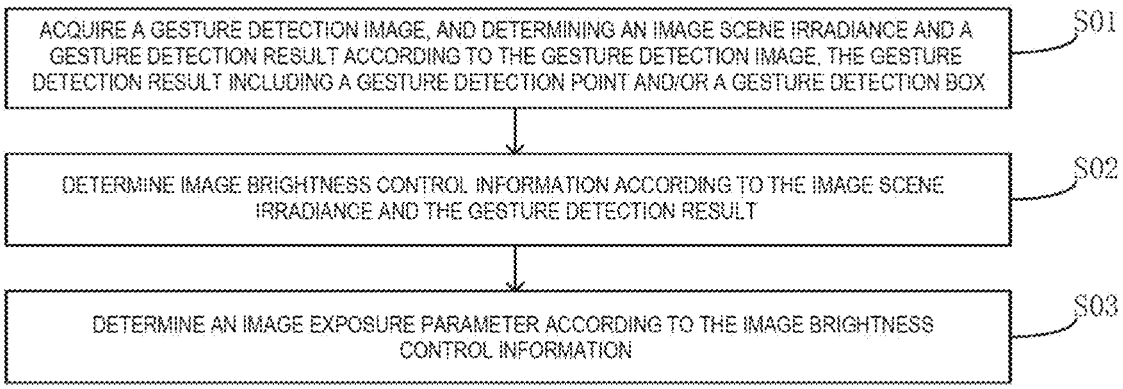
FIG. 1 is a first flowchart of a method for determining an exposure parameter according to an embodiment of the present disclosure.

Embodiments of the present disclosure will be described below with reference to the accompanying drawings. Although the accompanying drawings illustrate some embodiments of the present disclosure, it should be understood that the present disclosure may be implemented in various forms, and is not limited to the embodiments set forth herein. On the contrary, these embodiments are provided for a more thorough and complete understanding of the present disclosure. It should be understood that the accompanying drawings and the embodiments of the present disclosure are merely for illustrative purposes, and are not intended to limit the scope of protection of the present disclosure.

It should be understood that the steps described in the method embodiments of the present disclosure may be executed in different orders and/or in parallel. In addition, the method embodiments may include additional steps and/or omit the execution of the shown steps. The scope of the present disclosure is not limited in this regard.

As used herein, term "include" and its variants should be open-ended, i.e., "including but not limited to". Term "based on" means "at least partially based on". Term "one embodiment" means "at least one embodiment"; term "another embodiment" means "at least one additional embodiment"; and term "some embodiments" means "at least some embodiments". Relevant definitions of other terms will be provided in the following text. Term "in response to" and its relevant term mean that one signal or event is affected by another signal or event to a certain extent, but is not necessarily completely or directly affected. If event x occurs "in response to" event y, x may respond to y directly or indirectly. For example, the appearance of y may eventually lead to the appearance of x, but there may be another intermediate event and/or condition. In other cases, y may not necessarily lead to the appearance of x, and x may occur even if y has not yet occurred. In addition, term "in response to" may also mean "at least partially respond to".

Term "determine" widely covers a variety of actions. The actions may include actions such as obtaining, calculating, computing, processing, deducing, researching, searching (for example, searching a table, a database, or another data structure), and proving, and may further include actions such as receiving (for example, receiving information) and accessing (for example, accessing data in a memory), as well as actions such as parsing, selecting, choosing, establishing, and the like. Relevant definitions of other terms will be provided in the following text. Relevant definitions of other terms will be provided in the following text.

It should be noted that concepts such as "first", "second", and the like mentioned in the present disclosure are only used to distinguish between different devices, modules or units, and are not used to limit an order or an interdependence relationship of functions performed by these devices, modules or units.

It should be noted that term "one" mentioned in the present disclosure is illustrative rather than restrictive. Those skilled in the art should understood that this term should be understood as "one or more" unless the context clearly indicates otherwise.

Names of messages or information exchanged among a plurality of devices in the embodiments of the present disclosure are only for illustrative purposes, and are not intended to limit the scopes of these messages or the information.

It should be noted that according to a gesture exposure solution in the related art which uses an average image brightness in a gesture detection box as a brightness control index, an exposure parameter fluctuates with constant movement of hands between a bright-colored desktop and a dark-colored keyboard or screen background, which is embodied as brightness oscillation of an entire image. As a result, the stability of the gesture detection algorithm is affected. In addition, it is hard to cope with gesture detection in special scenes such as a highly dynamic scene by using an exposure algorithm that uses an average image brightness in a gesture detection box as a control index. In such scenes, the exposure of the gesture detection algorithm is usually unstable.

Solutions provided by the embodiments of the present disclosure will be described below in detail with reference to the accompanying drawings.

FIG. 1 is a flowchart of a method for determining an exposure parameter according to an embodiment of the present disclosure. The method includes the following steps.

In step S01, a gesture detection image is acquired, and an image scene irradiance and a gesture detection result are determined according to the gesture detection image, the gesture detection result including a gesture detection point and/or a gesture detection box.

Figure 2:
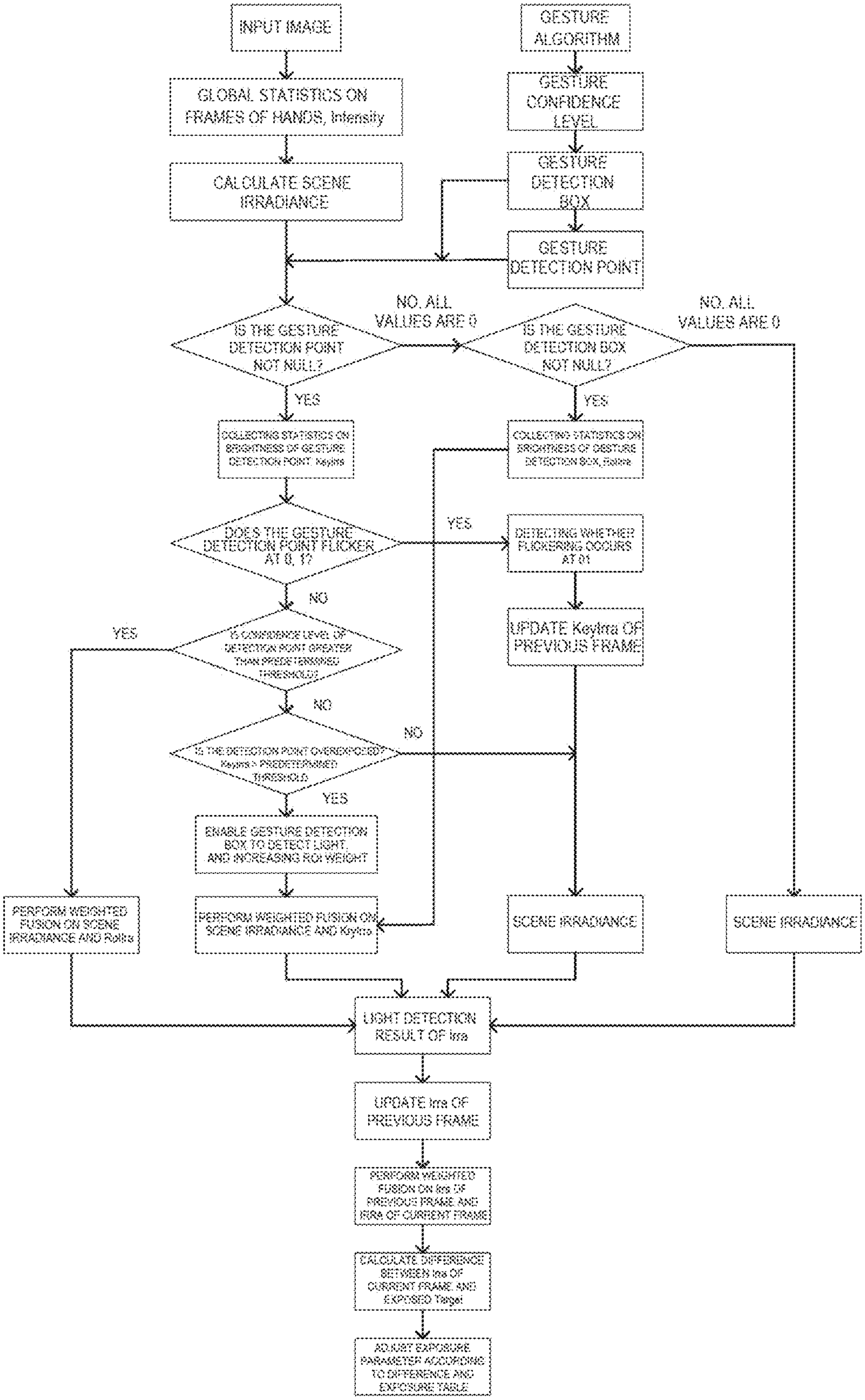
FIG. 2 is a second flowchart of a method for determining an exposure parameter according to an embodiment of the present disclosure.

In some embodiments, as shown in FIGS. 1 and 2, a gesture detection image and a corresponding exposure parameter are acquired first, where the exposure parameter includes an exposure time (Time) and an exposure gain (Gain). At the same time, a gesture detection image of a current frame is detected according to a gesture detection algorithm to obtain a gesture confidence level, a gesture detection box region of interest (ROI), and a gesture detection point (including coordinate information). Then, statistics on an average brightness (Intensity) of the current frame are collected according to a statistics collecting method such as global sampling, regional sampling, and down-sampling, which is not specifically limited herein. The image scene irradiance (Irradiance) is equal to Intensity/(Time*Gain), and is used as a brightness control index.

In step S02, image brightness control information is determined according to the image scene irradiance and the gesture detection result.

In some embodiments, the brightness control index is determined based on the image scene irradiance and the gesture detection point. Specifically, if the gesture detection point is null, the image brightness control information is determined according to the gesture detection box and the image scene irradiance obtained according to the gesture detection algorithm. Alternatively, if the gesture detection point is not null, the image brightness control information is determined according to an irradiance of a gesture detection point of the current frame, an irradiance of a gesture detection point of a previous frame, and the image scene irradiance.

In step S03, an image exposure parameter is determined according to the image brightness control information.

In some embodiments, after the image brightness control information is determined, weighted fusion temporal smoothing filtering is performed on image brightness control information of the current frame and image brightness control information of the previous frame to obtain processed image brightness control information of the current frame. Then, an image exposure parameter of the current frame is adjusted according to the processed image brightness control information of the current frame and a predetermined image exposure table, and gesture detection is performed according to the adjusted image.

In the method for determining an exposure parameter according to the embodiment of the present disclosure, a gesture detection image is acquired, and an image scene irradiance and a gesture detection result are determined according to the gesture detection image, the gesture detection result including a gesture detection point and/or a gesture detection box; image brightness control information is determined according to the image scene irradiance and the gesture detection result; and an image exposure parameter is determined according to the image brightness control information. The embodiment of the present disclosure can avoid the problem that gesture exposure oscillates due to instability of the gesture detection algorithm and the gesture region image having different brightness, and can provide an image having a stable brightness and high quality for the gesture detection algorithm.

In some embodiments, determining the image scene irradiance and the gesture detection result according to the gesture detection image includes:

determining the gesture detection result according to a gesture detection algorithm; and determining the image scene irradiance according to an image exposure parameter and an average image scene brightness of the gesture detection image.

In some embodiments, determining the image scene irradiance according to the image exposure parameter and the average image scene brightness of the gesture detection image includes:

dividing the average image scene brightness by the image exposure parameter to obtain the image scene irradiance.

In some embodiments, determining the image brightness control information according to the image scene irradiance and the gesture detection result includes:

determining image brightness control information according to the image scene irradiance and an irradiance of the gesture detection point.

In some embodiments, determining the image brightness control information according to the image scene irradiance and the irradiance of the gesture detection point includes:

in response to the gesture detection point being not null, determining the image brightness control information according to the image scene irradiance and the irradiance of the gesture detection point.

In some embodiments, determining the image brightness control information according to the image scene irradiance and the irradiance of the gesture detection point includes:

in response to the gesture detection point being not flickering and/or a confidence level of the gesture detection point being greater than a predetermined threshold, determining the image brightness control information according to the image scene irradiance and the irradiance of the gesture detection point.

In some embodiments, the gesture detection point being not flickering means that both the gesture detection point of the current frame and the gesture detection point of the previous frame are not null.

In some embodiments, determining the image brightness control information according to the image scene irradiance and the irradiance of the gesture detection point includes:

calculating a weighted sum of the image scene irradiance and the irradiance of the gesture detection point to obtain the image brightness control information.

In some embodiments, determining the image brightness control information according to the image scene irradiance and the gesture detection result includes:

determining the image brightness control information according to the image scene irradiance and an irradiance of the gesture detection box.

In some embodiments, determining the image brightness control information according to the image scene irradiance and the irradiance of the gesture detection box includes:

in response to the gesture detection point being null and the gesture detection box being not null, or in response to the gesture detection point being not null, the confidence level of the gesture detection point being less than the predetermined threshold, and the irradiance of the gesture detection point being greater than a predetermined threshold, determining the image brightness control information according to the image scene irradiance and the irradiance of the gesture detection box.

In some embodiments, determining the image brightness control information according to the image scene irradiance and the irradiance of the gesture detection box includes:

calculating a weighted sum of the image scene irradiance and the irradiance of the gesture detection box to obtain the image brightness control information.

In some embodiments, determining the image brightness control information according to the image scene irradiance and the gesture detection result includes:

in response to the gesture detection point being null and the gesture detection box being null, or in response to the gesture detection point being not null, determining the image brightness control information according to the image scene irradiance.

In some embodiments, determining the image brightness control information according to the image scene irradiance includes:

in response to the gesture detection point being not null and the gesture detection point being flickering, or in response to the gesture detection point being not flickering and the irradiance of the gesture detection point being less than the predetermined threshold, determining the image brightness control information according to the image scene irradiance.

In some embodiments, the gesture detection point being not flickering means that both the gesture detection point of the current frame and the gesture detection point of the previous frame are not null.

In some embodiments, the irradiance of the gesture detection point is obtained by adding pixels of the gesture detection point and dividing an adding result by the image exposure parameter.

In some embodiments, after determining the image brightness control information, the method further includes:

performing weighted fusion temporal smoothing filtering on image brightness control information of a current frame and image brightness control information of a previous frame to obtain processed image brightness control information of the current frame.

In some embodiments, determining the image exposure parameter according to the image brightness control information includes:

determining an image exposure parameter of the current frame according to the processed image brightness control information of the current frame and a predetermined image exposure table.

In some embodiments, as shown in FIG. 2, whether a gesture detection point introduced from the gesture detection algorithm is null is determined first. If the detection point is null, whether a gesture detection box ROI introduced from the gesture detection algorithm is null is determined subsequently. If the ROI is null, the image scene irradiance (scene Irra) is directly used as a brightness control index. If the ROI is not null, a weighted sum of scene Irra and an Irra in an ROI region (obtained by dividing a sum of all pixels in the ROI region by Gain*Time) is calculated and is used as a brightness control index, where the weighted sum may be obtained by dividing (a*scene Irra+b*ROIIrra) by (a+b).

In some embodiments, if the detection point is not null, irradiance statistics on the detection point is collected, where KeyIrra is obtained by dividing a sum of all pixels of the detection point by (Gain*Time). Then, whether the detection point exists intermittently is determined. This is because hands may not be detected in an adjacent frame due to instability of gesture detection. In this case, since the detection point is not null, it only requires to determine whether a previous frame is null, that is, determining whether KeyIrra-KeyIrraLast is equal to KeyIrra. If KeyIrra-KeyIrraLast is equal to KeyIrra, the detection point flickers, and scene Irra is used as the brightness control index. If the detection point does not flicker at 01, whether the detection point is confident is determined (to avoid false detection). If the confidence level of the detection point is greater than or equal to a predetermined threshold (e.g., 0.85), a weighted sum of scene Irra and KeyIrra is used as the brightness control index. If the confidence level is less than the predetermined threshold, whether hands are overexposed is determined, that is, whether KeyIrra is greater than a predetermined threshold (e.g., 240/(Gain*Time)) is determined. If KeyIrra is greater than the predetermined threshold, it indicates that the hands are overexposed. In this case, a weighted sum of scene Irra and Irra in the ROI region is used as the brightness control index. (In this case, the weight of ROI needs to be increased. For example, if the original weight is b, the weight used in this case may be 3b.) If the hands are not overexposed, scene Irra is used as the brightness control index.

In some embodiments, after the brightness control index is determined, a light detection result, namely, the image brightness control information can be obtained based on the brightness control index. At this time, the Irra brightness control index of the current frame is updated to be used for temporal filtering of a next frame. At the same time, weighted fusion temporal smoothing filtering is performed on Irra of the previous frame and Irra of the current frame, to obtain a final brightness control index.

In some embodiments, after the final brightness control index Irra is obtained, a difference between Irra*(Gain*Time of the current frame) and exposed Target is calculated; and the exposure parameter is updated according to the difference and the predetermined exposure table.

It can be seen that because a gesture detection algorithm and an automatic exposure algorithm are optimized jointly, and an average brightness is replaced with a scene irradiance, a negative effect of fluctuation of an exposure parameter on the average brightness can be avoided. With reference to prior information obtained via gesture detection and including a gesture detection box as well as information about a key detection point of a hand portion arthrosis that is predicted according to a gesture algorithm, a light detection method of automatic exposure is optimized; and by performing algorithm logic judgment and temporal filtering, stability of a gesture exposure algorithm is enhanced, and gesture exposure oscillation caused by a gesture detection algorithm is avoided. This improves stability and correctness of the gesture detection algorithm.

The embodiment of the present disclosure can solve the problem of interframe brightness jumping and oscillation by performing temporal smoothing filtering on the brightness control index.

Figure 3:
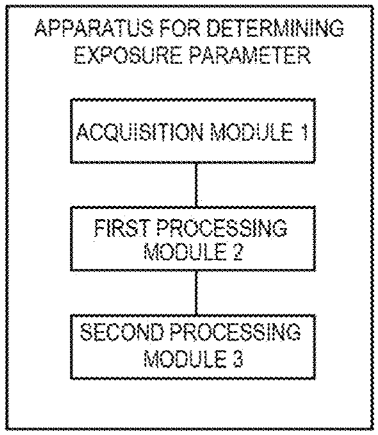
FIG. 3 is a schematic structural diagram of an apparatus for determining an exposure parameter according to an embodiment of the present disclosure.

As shown in FIG. 3, an apparatus for determining an exposure parameter is further provided according to an embodiment of the present disclosure. The apparatus includes:

an acquisition module 1 configured to acquire a gesture detection image, and determine an image scene irradiance and a gesture detection result according to the gesture detection image, the gesture detection result including a gesture detection point and/or a gesture detection box;

a first processing module 2 configured to determine image brightness control information according to the image scene irradiance and the gesture detection result; and a second processing module 3 configured to determine an image exposure parameter according to the image brightness control information.

In some embodiments, the acquisition module is specifically configured to:

determine the gesture detection result according to a gesture detection algorithm; and determine the image scene irradiance according to an image exposure parameter and an average image scene brightness of the gesture detection image.

In some embodiments, the acquisition module is specifically configured to:

divide the average image scene brightness by the image exposure parameter to obtain the image scene irradiance.

In some embodiments, the first processing module is specifically configured to:

determine the image brightness control information according to the image scene irradiance and an irradiance of the gesture detection point.

In some embodiments, the first processing module is specifically configured to:

in response to the gesture detection point being not null, determine the image brightness control information according to the image scene irradiance and the irradiance of the gesture detection point.

In some embodiments, the first processing module is specifically configured to:

in response to the gesture detection point being not flickering and/or a confidence level of the gesture detection point being greater than a predetermined threshold, determine the image brightness control information according to the image scene irradiance and the irradiance of the gesture detection point.

In some embodiments, the first processing module is specifically configured to:

calculate a weighted sum of the image scene irradiance and the irradiance of the gesture detection point to obtain the image brightness control information.

In some embodiments, the first processing module is specifically configured to:

determine the image brightness control information according to the image scene irradiance and an irradiance of the gesture detection box.

In some embodiments, the first processing module is specifically configured to:

in response to the gesture detection point being null and the gesture detection box being not null, or in response to the gesture detection point being not null, the confidence level of the gesture detection point being less than the predetermined threshold, and the irradiance of the gesture detection point being greater than a predetermined threshold, determine the image brightness control information according to the image scene irradiance and the irradiance of the gesture detection box.

In some embodiments, the first processing module is specifically configured to:

calculate a weighted sum of the image scene irradiance and the irradiance of the gesture detection box to obtain the image brightness control information.

In some embodiments, the first processing module is specifically configured to:

in response to the gesture detection point being null and the gesture detection box being null, or in response to the gesture detection point being not null, determine the image brightness control information according to the image scene irradiance.

In some embodiments, the first processing module is specifically configured to:

in response to the gesture detection point being not null and the gesture detection point being flickering, or in response to the gesture detection point being not flickering and the irradiance of the gesture detection point being less than the predetermined threshold, determine the image brightness control information according to the image scene irradiance.

In some embodiments, the irradiance of the gesture detection point is obtained by adding pixels of the gesture detection point and dividing an adding result by the image exposure parameter.

In some embodiments, after determining the image brightness control information, the first processing module is further specifically configured to:

perform weighted fusion temporal smoothing filtering on image brightness control information of a current frame and image brightness control information of a previous frame to obtain processed image brightness control information of the current frame.

In some embodiments, after determining the image brightness control information, the first processing module is further specifically configured to:

determine an image exposure parameter of the current frame according to the processed image brightness control information of the current frame and a predetermined image exposure table.

Since the apparatus embodiments basically correspond to the method embodiments, for related details of the apparatus embodiments, reference may be made to descriptions of the method embodiments. The apparatus embodiment described above are merely schematic, where the modules described as separate modules may or may not be separate. Some or all of the modules may be selected according to actual needs to achieve objectives of the solution of this embodiment. Those of ordinary skill in the art can understand and implement this embodiment without creative effort.

The method and the apparatus according to the present disclosure have been described above based on the embodiments and the application examples. In addition, the present disclosure further provides an electronic device and a computer-readable storage medium, which are described below.

Figure 4:
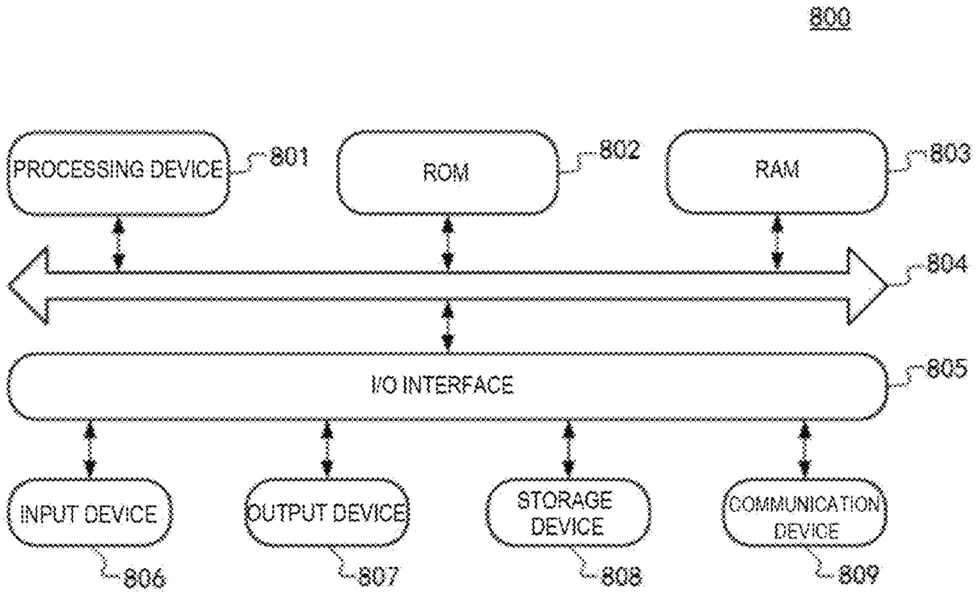
FIG. 4 is a schematic structural diagram of an electronic device according to an embodiment of the present disclosure.

Reference is made to FIG. 4, which shows a schematic diagram of an electronic device (such as a terminal device or a server) 800 according to an embodiment of the present disclosure. The electronic device in the embodiment of the present disclosure may include but is not limited to a mobile terminal, such as a mobile phone, a notebook computer, a digital broadcast receiver, a personal digital assistant (PDA), a tablet computer (PAD), a portable multimedia player (PMP), an onboard terminal (such as an onboard navigation terminal), and a fixed terminal, such as a digital TV and a desktop computer. The electronic device shown in FIG. 5 is only an example, and should not limit the function and application range of the embodiments of the present disclosure.

The electronic device 800 may include a processing device (such as a central processing unit, a graphics processing unit, or the like) 801 that may perform various appropriate actions and processing according to a program stored in a read-only memory (ROM) 802 or a program loaded from a storage device 808 into a random-access memory (RAM) 803. In the RAM 803, various programs and data required for operation of the electronic device are further stored. The processing device 801, the ROM 802, and the RAM 803 are connected to each other by using a bus 804. An input/output (I/O) interface 805 is also connected to the bus 804.

Generally, the following apparatuses may be connected to the I/O interface 805: an input device 806 including, for example, a touchscreen, a touchpad, a keyboard, a mouse, a camera, a microphone, an accelerometer, and a gyroscope; an output device 807 including, for example, a liquid crystal display (LCD), a loudspeaker and a vibrator; a storage device 808 including, for example, a tape or a hard disk; and a communication device 809. The communication device 809 may allow the electronic device to communicate wirelessly or wiredly with another device to exchange data. Although FIG. 4 shows an electronic device with various apparatuses, it should be understood that it is not required to implement or provide all shown apparatuses. Alternatively, more or fewer apparatuses may be implemented or provided.

In particular, according to the embodiments of the present disclosure, the process described above with reference to the flowchart may be implemented as a computer software program. For example, an embodiment of the present disclosure includes a computer software program product that includes a computer program carried on a readable medium, and the computer program includes program codes used to perform the method shown in the flowchart. In such an embodiment, the computer program may be downloaded and installed from a network by using the communication device 809, installed from the storage device 808, or installed from the ROM 802. When the computer program is executed by the processing device 801, the foregoing functions defined in the method in the embodiments of the present disclosure are executed.

It should be noted that the foregoing computer-readable medium in the present disclosure may be a computer-readable signal medium, a computer-readable storage medium, or any combination of the two. The computer-readable storage medium may be, for example, an electrical, magnetic, optical, electromagnetic, infrared, or semiconductor system, apparatus, or device, or any combination thereof. More specific examples of the computer-readable storage medium may include but are not limited to: an electrical connection having one or more conducting wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that includes or stores a program, and the program may be used by or in combination with an instruction execution system, apparatus, or device. In the present disclosure, the computer-readable signal medium may include a data signal propagated in a baseband or as a part of a carrier, which carries computer-readable program codes. Such a propagated data signal may be in multiple forms, including but not limited to an electromagnetic signal, an optical signal, or any suitable combination thereof. The computer-readable signal medium may further be any computer-readable medium other than the computer-readable storage medium, and the computer-readable signal medium may send, propagate, or transmit a program that is used by or in combination with an instruction execution system, apparatus, or device. The program code included in the computer-readable medium may be transmitted by using any suitable medium, including but not limited to: a wire, an optical cable, a radio frequency (RF), or any suitable combination thereof.

In some embodiments, the client and the server can communicate by using any currently known or future-developed network protocol, for example, an HTTP (Hyper Text Transfer Protocol), and can be interconnected by a communication network of any form or any medium. Examples of the communication network include a local area network (LAN), a wide area network (WAN), an internet network (for example, the Internet), and an end-to-end network (for example, an ad hoc end-to-end network), and any currently known or future-developed network.

The computer-readable medium may be included in the foregoing electronic device, or may exist separately and not be assembled into the electronic device.

The computer-readable medium carries one or more programs, which causes the electronic device to execute the methods of the present disclosure when the one or more programs are executed by the electronic device.

Computer program codes for performing the operations of the present disclosure may be written in one or more programming languages or a combination thereof, such as object-oriented programming languages Java, Smalltalk, C++, and conventional procedural programming languages such as "C" or similar program design languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

Flowcharts and block diagrams in the accompanying drawings illustrate possible architectures, functions, and operations of systems, methods, and computer program products according to various embodiments of the present disclosure. In this regard, each block in a flowchart or block diagram may represent a module, program segment, or part of code that includes one or more executable instructions for implementing a specified logical function. It should also be noted that in some alternative implementations, functions marked in the block may also occur in different order than those marked in the accompanying drawings. For example, two blocks represented in succession may actually be executed in substantially parallel, and they may sometimes be executed in a reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and a computer instruction.

The units described in embodiments of the present disclosure may be implemented either by means of software or by means of hardware. The names of these units do not limit the units themselves under certain circumstances.

Various functions described herein above can be implemented by one or more hardware logic members. For example and without limitations thereto, an exemplary hardware logic member includes a field programmable gate array (FPGA), an application-specific integrated circuit (ASIC), an application-specific standard product (ASSP), a system-on-chip system (SOC), a complex programmable logic device (CPLD) or the like.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses or devices, or any suitable combination of the foregoing. More specific examples of machine-readable storage media would include one or more wire-based electrical connections, portable computer disks, hard disks, random-access memories (RAMs), read-only memories (ROMs), erasable programmable read-only memories (EPROM or flash memories), fiber optics, portable compact disk read only memories (CD-ROMs), optical storage devices, magnetic storage devices, or any suitable combination of the foregoing.

According to one or more embodiments of the present disclosure, a method for determining an exposure parameter is provided. The method includes:

acquiring a gesture detection image, and determining an image scene irradiance and a gesture detection result according to the gesture detection image, the gesture detection result including a gesture detection point and/or a gesture detection box;

determining image brightness control information according to the image scene irradiance and the gesture detection result; and determining an image exposure parameter according to the image brightness control information.

According to one or more embodiments of the present disclosure, a method is provided, and determining the gesture detection result according to a gesture detection algorithm includes:

determining the image scene irradiance according to an image exposure parameter and an average image scene brightness of the gesture detection image.

According to one or more embodiments of the present disclosure, a method is provided, and determining the image scene irradiance according to the image exposure parameter and the average image scene brightness of the gesture detection image includes:

dividing the average image scene brightness by the image exposure parameter to obtain the image scene irradiance.

According to one or more embodiments of the present disclosure, a method is provided, and determining the image brightness control information according to the image scene irradiance and the gesture detection result includes:

determining the image brightness control information according to the image scene irradiance and an irradiance of the gesture detection point.

According to one or more embodiments of the present disclosure, a method is provided, and determining the image brightness control information according to the image scene irradiance and the irradiance of the gesture detection point includes:

in response to the gesture detection point being not null, determining the image brightness control information according to the image scene irradiance and the irradiance of the gesture detection point.

According to one or more embodiments of the present disclosure, a method is provided, and determining the image brightness control information according to the image scene irradiance and the irradiance of the gesture detection point includes:

in response to the gesture detection point being not flickering and/or a confidence level of the gesture detection point being greater than a predetermined threshold, determining the image brightness control information according to the image scene irradiance and the irradiance of the gesture detection point.

According to one or more embodiments of the present disclosure, a method is provided, and determining the image brightness control information according to the image scene irradiance and the irradiance of the gesture detection point includes:

calculating a weighted sum of the image scene irradiance and the irradiance of the gesture detection point to obtain the image brightness control information.

According to one or more embodiments of the present disclosure, a method is provided, and determining the image brightness control information according to the image scene irradiance and the gesture detection result includes:

determining the image brightness control information according to the image scene irradiance and an irradiance of the gesture detection box.

According to one or more embodiments of the present disclosure, a method is provided, and determining the image brightness control information according to the image scene irradiance and the irradiance of the gesture detection box includes:

in response to the gesture detection point being null and the gesture detection box being not null, or in response to the gesture detection point being not null, the confidence level of the gesture detection point being less than a predetermined threshold, and the irradiance of the gesture detection point being greater than a predetermined threshold, determining the image brightness control information according to the image scene irradiance and the irradiance of the gesture detection box.

According to one or more embodiments of the present disclosure, a method is provided, and determining the image brightness control information according to the image scene irradiance and the irradiance of the gesture detection box includes:

calculating a weighted sum of the image scene irradiance and the irradiance of the gesture detection box to obtain the image brightness control information.

According to one or more embodiments of the present disclosure, a method is provided, and determining the image brightness control information according to the image scene irradiance and the gesture detection result includes:

in response to the gesture detection point being null and the gesture detection box being null, or in response to the gesture detection point being not null, determining the image brightness control information according to the image scene irradiance.

According to one or more embodiments of the present disclosure, a method is provided, and determining the image brightness control information according to the image scene irradiance includes:

in response to the gesture detection point being not null and the gesture detection point being flickering, or in response to the gesture detection point being not flickering and the irradiance of the gesture detection point being less than the predetermined threshold, determining the image brightness control information according to the image scene irradiance.

According to one or more embodiments of the present disclosure, a method is provided, and the irradiance of the gesture detection point is obtained by adding pixels of the gesture detection point and dividing an adding result by the image exposure parameter.

According to one or more embodiments of the present disclosure, a method is provided, and after determining the image brightness control information, the method further includes:

performing weighted fusion temporal smoothing filtering on image brightness control information of a current frame and image brightness control information of a previous frame to obtain processed image brightness control information of the current frame.

According to one or more embodiments of the present disclosure, a method is provided, and determining the image exposure parameter according to the image brightness control information includes:

determining an image exposure parameter of the current frame according to the processed image brightness control information of the current frame and a predetermined image exposure table.

According to one or more embodiments of the present disclosure, an apparatus for determining an exposure parameter is provided. The apparatus includes:

an acquisition module configured to acquire a gesture detection image, and determine an image scene irradiance and a gesture detection result according to the gesture detection image, the gesture detection result including a gesture detection point and/or a gesture detection box;

a first processing module configured to determine image brightness control information according to the image scene irradiance and the gesture detection result; and a second processing module configured to determine an image exposure parameter according to the image brightness control information.

According to one or more embodiments of the present disclosure, an electronic device is provided. The electronic device includes at least one memory and at least one processor.

The at least one memory is configured to store program codes, and the at least one processor is configured to call the program codes stored in the at least one memory to perform the method according to any one of the above embodiments.

According to one or more embodiments of the present disclosure, a computer-readable storage medium is provided. The computer-readable storage medium is configured to store program codes which, when executed by a processor, cause the processor to perform the above method.

The above only describes preferred embodiments of the present disclosure and is an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept, for example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logical actions, it should be understood that the subject matter limited in the appended claims is not necessarily limited to the particular features or actions described above. Rather, the particular features and actions described above are merely example forms of implementing the claims.

The invention claimed is:

1. A method for determining an exposure parameter, comprising:

acquiring a gesture detection image, and determining an image scene irradiance and a gesture detection result according to the gesture detection image, the gesture detection result including a gesture detection point and/or a gesture detection box, wherein the image scene irradiance is obtained by dividing an average image scene brightness by an image exposure parameter;

determining image brightness control information according to the image scene irradiance and the gesture detection result; and determining the image exposure parameter according to the image brightness control information.

2. The method of claim 1, wherein determining the image scene irradiance and the gesture detection result according to the gesture detection image comprises:

determining the gesture detection result according to a gesture detection algorithm; and determining the image scene irradiance according to the image exposure parameter and the average image scene brightness of the gesture detection image.

3. The method of claim 2, wherein determining the image scene irradiance according to the image exposure parameter and the average image scene brightness of the gesture detection image comprises:

dividing the average image scene brightness by the image exposure parameter to obtain the image scene irradiance.

4. The method of claim 1, wherein determining the image brightness control information according to the image scene irradiance and the gesture detection result comprises:

determining the image brightness control information according to the image scene irradiance and an irradiance of the gesture detection point.

5. The method of claim 4, wherein determining the image brightness control information according to the image scene irradiance and the irradiance of the gesture detection point comprises:

in response to the gesture detection point being not null, determining the image brightness control information according to the image scene irradiance and the irradiance of the gesture detection point.

6. The method of claim 5, wherein determining the image brightness control information according to the image scene irradiance and the irradiance of the gesture detection point comprises:

in response to the gesture detection point being not flickering and/or a confidence level of the gesture detection point being greater than a predetermined threshold, determining the image brightness control information according to the image scene irradiance and the irradiance of the gesture detection point.

7. The method of claim 6, wherein determining the image brightness control information according to the image scene irradiance and the irradiance of the gesture detection point comprises:

calculating a weighted sum of the image scene irradiance and the irradiance of the gesture detection point to obtain the image brightness control information.

8. The method of claim 1, wherein determining the image brightness control information according to the image scene irradiance and the gesture detection result comprises:

determining the image brightness control information according to the image scene irradiance and an irradiance of the gesture detection box.

9. The method of claim 8, wherein determining the image brightness control information according to the image scene irradiance and the irradiance of the gesture detection box comprises:

in response to the gesture detection point being null and the gesture detection box being not null, or in response to the gesture detection point being not null, a confidence level of the gesture detection point being less than a pre-determined threshold, and an irradiance of the gesture detection point being greater than the pre-determined threshold, determining the image brightness control information according to the image scene irradiance and the irradiance of the gesture detection box.

10. The method of claim 9, wherein determining the image brightness control information according to the image scene irradiance and the irradiance of the gesture detection box comprises:

calculating a weighted sum of the image scene irradiance and the irradiance of the gesture detection box to obtain the image brightness control information.

11. The method of claim 1, wherein determining the image brightness control information according to the image scene irradiance and the gesture detection result comprises:

in response to the gesture detection point being null and the gesture detection box being null, or in response to the gesture detection point being not null, determining the image brightness control information according to the image scene irradiance.

12. The method of claim 11, wherein determining the image brightness control information according to the image scene irradiance comprises:

in response to the gesture detection point being not null and the gesture detection point being flickering, or in response to the gesture detection point being not flickering and an irradiance of the gesture detection point being less than a pre-determined threshold, determining the image brightness control information according to the image scene irradiance.

13. The method of claim 4, wherein the irradiance of the gesture detection point is obtained by adding pixels of respective gesture detection point of a plurality of gesture detection points and dividing the pixels by the image exposure parameter.

14. The method of claim 1, after determining the image brightness control information, further comprising:

performing a weighted fusion temporal smoothing filtering on image brightness control information of a current frame and image brightness control information of a previous frame image to obtain processed image brightness control information of the current frame.

15. The method of claim 14, wherein determining the image exposure parameter according to the image brightness control information comprises:

determining an image exposure parameter of the current frame according to the processed image brightness control information of the current frame and a predetermined image exposure table.

16. An electronic device, comprising:

at least one memory and at least one processor;

wherein the at least one memory is configured to store program code, and the at least one processor is configured to call the program code stored in the at least one memory to perform acts comprising:

acquiring a gesture detection image, and determining an image scene irradiance and a gesture detection result according to the gesture detection image, the gesture detection result including a gesture detection point and/or a gesture detection box, wherein the image scene irradiance is obtained by dividing an average image scene brightness by an image exposure parameter;

determining image brightness control information according to the image scene irradiance and the gesture detection result; and determining the image exposure parameter according to the image brightness control information.

17. The electronic device of claim 16, wherein determining the image scene irradiance and the gesture detection result according to the gesture detection image comprises:

determining the gesture detection result according to a gesture detection algorithm; and determining the image scene irradiance according to the image exposure parameter and the average image scene brightness of the gesture detection image.

18. The electronic device of claim 17, wherein determining the image scene irradiance according to the image exposure parameter and the average image scene brightness of the gesture detection image comprises:

dividing the average image scene brightness by the image exposure parameter to obtain the image scene irradiance.

19. The electronic device of claim 16, wherein determining the image brightness control information according to the image scene irradiance and the gesture detection result comprises:

determining the image brightness control information according to the image scene irradiance and an irradiance of the gesture detection point.

20. A non-transitory computer-readable storage medium for storing program code, the program code, when executed by a computer device, causing the computer device to perform acts comprising:

acquiring a gesture detection image, and determining an image scene irradiance and a gesture detection result according to the gesture detection image, the gesture detection result including a gesture detection point and/or a gesture detection box, wherein the image scene irradiance is obtained by dividing an average image scene brightness by an image exposure parameter;

determining image brightness control information according to the image scene irradiance and the gesture detection result; and determining the image exposure parameter according to the image brightness control information.

* * * * *